(12) United States Patent
Goel

(10) Patent No.: US 12,333,045 B2
(45) Date of Patent: Jun. 17, 2025

(54) DISTRIBUTED COMMUNICATION NETWORK

(71) Applicant: Solve.Care Foundation OÜ, Tallinn (EE)

(72) Inventor: Pradeep Goel, Fort Lauderdale, FL (US)

(73) Assignee: Solve Care Foundation OÜ, Tallinn (EE)

( * ) Notice: Subject to any disclaimer, the term of this patent is extended or adjusted under 35 U.S.C. 154(b) by 137 days.

(21) Appl. No.: 18/074,783

(22) Filed: Dec. 5, 2022

(65) Prior Publication Data

US 2023/0177209 A1    Jun. 8, 2023

Related U.S. Application Data

(60) Provisional application No. 63/286,197, filed on Dec. 6, 2021.

(51) Int. Cl.
| | | |
|---|---|---|
| *G06F 21/62* | (2013.01) | |
| *H04L 9/08* | (2006.01) | |
| *H04L 9/30* | (2006.01) | |

(52) U.S. Cl.
CPC ........ *G06F 21/6245* (2013.01); *H04L 9/0825* (2013.01); *H04L 9/3066* (2013.01)

(58) Field of Classification Search
CPC . G06F 21/6245; H04L 9/0825; H04L 9/3066; H04L 2209/88; H04L 9/14; H04L 63/061; H04L 63/123; H04L 9/50; H04L 63/045; H04L 63/168
See application file for complete search history.

(56) References Cited

U.S. PATENT DOCUMENTS

| | | | |
|---|---|---|---|
| 10,749,848 B2 | 8/2020 | Voell et al. | |
| 2014/0089658 A1* | 3/2014 | Raghuram | .......... G06F 9/45533 380/278 |
| 2020/0100108 A1* | 3/2020 | Everson | ................ H04L 9/3242 |
| 2021/0303713 A1 | 9/2021 | Sreedhar et al. | |

* cited by examiner

*Primary Examiner* — El Hadji M Sall
(74) *Attorney, Agent, or Firm* — Banner & Witcoff, Ltd.

(57) ABSTRACT

The present disclosure provides a distributed communication network comprising a plurality of computing nodes assigned to each participant of the network and a method of controlling access to data shared on said network. The computing node operates according to a set of pre-defined rules to control how a participant is able to behave on the network, that is, with whom they are able to communicate and on what basis, whilst at the same time giving the participant complete control over their data. The pre-defined rules are published to a blockchain ledger as a network protocol ledger to ensure it is immutable, traceable and easily distributed. In doing so, network protocol(s) not only specify the rules for the network but also enforces the rules on the participants to ensure it complies with the pre-defined behaviour.

19 Claims, 10 Drawing Sheets

DISTRIBUTED COMMUNICATION NETWORK

CROSS-REFERENCE TO RELATED APPLICATIONS

This application is a non-provisional of U.S. Application No. 63/286,197, filed Dec. 6, 2021, having the same title, herein incorporated by reference in its entirety for all purposes.

FIELD

The present disclosure relates to a distributed communication network and a method of controlling access to data shared on said network. In particular, the present disclosure relates to a distributed communication network comprising one or more computing nodes for providing secure peer-to-peer communications.

BACKGROUND

Many communication networks work on a centralized basis, wherein a central entity controls the nodes operating on the network. In such networks, data is in the control of a single party, typically the administrator, regardless of who the data belongs or relates to, thereby giving all the power over that data to the single party. A problem with this is that data custody and ownership are conflated, for example, healthcare data in the custody of a hospital or insurer cuts out the actual data owner, i.e., the patient. Once data has been shared, it cannot be taken back, and the use of that data can also not be easily tracked, and thus the actual data owner has very little control over their data once in the custody of another party. Similarly, subsequent monetization of the data can be nefarious, even if the collection of the data was justifiable. There are also security issues associated with holding all data within one place, with the data being open to cyber-attacks. Finally, the data is decupled from logic, resulting in total lack of transparency as to how the data is analysed, by whom, when and whether correctly or with flawed premise and logic The world is moving towards Blockchain as a solution to the above problems, but that also has limitations. Whilst the data is no longer controlled by a central entity, data is indiscriminately replicated. Every party on the blockchain is given custody of the data, but ownership is still not defined. Similarly, shared data still cannot be taken back, and whilst access to data can be tracked, the actual use of the data cannot. Monetization of data monetization can still be nefarious, and the risk of attacks exists since all encrypted data is public and secured by the same encryption. Likewise, data is still decoupled from logic, and so the same issues around transparency of data usage remain.

SUMMARY

The present disclosure provides a distributed communication network comprising a plurality of computing nodes assigned to each participant of the network and a method of controlling access to data shared on said network. The computing node operates according to a set of pre-defined rules to control how a participant is able to behave on the network, that is, with whom they are able to communicate and on what basis, whilst at the same time giving the participant complete control over their data. The pre-defined rules are published to a blockchain ledger as a network protocol ledger to ensure it is immutable, traceable and easily distributed. In doing so, network protocol(s) not only specify the rules for the network but also enforces the rules on the participants to ensure it complies with the pre-defined behaviour.

The present disclosure thus addresses the complexity of managing role-based data sharing, role-based computational logic, role-based consent to use and right to revoke access and traceability of every instance of data use in the context of computational logic. As such, "data" in the context of a communications next work is redefined to mean more than just information, with the data being redefined as a combination information, transparent computational logic, a user role and the consent to process data based on said role.

To facilitate the above, the present disclosure provides a novel data security and access control mechanism that allows participants of the network to securely share and un-share data by providing complete control over who has access to said data, thereby enforcing ownership of the data even when it is in the custody of another party. The security and access control mechanism combines hashing, symmetric and asymmetric encryption decentralized communication and contextual use of data between two parties, defined by their respective roles and enforced by their respective nodes. In this respect, hashing techniques are first used to verify the identity of the sender and the receiver to establish their respective nodes and permitted uses of data. Symmetric encryption is used to encrypt the data payload that is to be shared, and then the symmetric key that is to be shared to with the receiver is encrypted further using asymmetric encryption. In doing so, the sender can effectively "unshare" the data at any time by re-encrypting the symmetric key for that data, thereby revoking the access granted to the receiver.

A first aspect of the present disclosure provides a distributed communications network comprising a plurality of computing nodes, wherein each computing node comprises a storage means comprising data, one or more cryptographic keys and computational logic defined by a set of rules of the distributed communications network, and a processing means configured to generate a data package to be shared in dependence on at least a portion of the data and the computational logic, encrypt the data package using a symmetric cryptographic key, and encrypt the symmetric cryptographic key using a public cryptographic key of a public-private key pair, and a transmitting means configured to transmit the encrypted data package and the encrypted symmetric cryptographic key to a further computing node.

As such, a distributed communications network is provided whereby encrypted data may be shared between two nodes provided that the computational logic, that is the rules of the communications network, allow for said data to be shared between the nodes. The pre-defined rules control how a participant of the network (i.e., each computing node) is able to behave on the network, that is, with whom they are able to communicate and on what basis (e.g., what types of data can be shared), whilst at the same time giving the participant complete control over their data. The pre-defined rules are preferably published to a blockchain ledger as a network protocol ledger to ensure it is immutable, traceable and easily distributed. This ensures that the rules are enforced and ensures that the participants comply with the pre-defined behaviour.

The storage means of the further computing node may comprise the private cryptographic key of the public-private key pair for decrypting the encrypted symmetric cryptographic key. That is to say, the public key used to encrypt the symmetric cryptographic key is the public key of a receiving computing node (i.e., the node that the data package is intended for), such that the receiving computing node is able to decrypt the encrypted symmetric cryptographic key using the corresponding private key. As such, each computing node may have an associated public-private key pair, the private key being stored in their respective storage means, and the public key being shared with other computing nodes with which data sharing is permitted. Each computing node may also store a copy of their respective public key.

In some arrangement, the computational logic may be determined based on a role allocated to a user of the computing node. That is to say, the rules of the communications network may allow data sharing between nodes that are associated with participants having a certain defined role. For example, in the context of a healthcare network, the computational logic may be defined such that data may only be shared between participants having a role defined as "patient" and "healthcare provider".

Each computing node may further comprise a receiver means configured to receive encrypted data packages and respective encrypted symmetric cryptographic keys from a further computing node. That is to say, each computing node has the means for receiving data from another computing node.

In such arrangements, the processing means may be further configured to decrypt the encrypted symmetric cryptographic key using a private cryptographic key of a public-private key pair stored in the storage means, decrypt the encrypted data package using the decrypted symmetric cryptographic key, and output the data contained within the data package for use. As described above, each computing node may store their own respective public-private key pair, wherein other computing nodes my encrypt the symmetric cryptographic key using the public key. The receiving computing node can then use their private key to decrypt the encrypted symmetric cryptographic key, which can then be used to access the encrypted data package.

In some arrangements, the processing means may be configured to re-encrypt the symmetric cryptographic key associated with a data package transmitted to a further computing node, such that the further computing node is unable to access the encrypted data package. That is to say, the transmitting computing node can re-encrypt the symmetric cryptographic key, for example, using a public key associated with a different private key that the receiving computing node does not have, such that the receiving node can no longer access the encrypted data package using the symmetric cryptographic key. Likewise, the processing means may be configured to re-encrypt the data package transmitted to a further computing node using a different symmetric cryptographic key, such that the further computing node is unable to access the encrypted data package. In doing so, the transmitting computing node has complete control over the data shared with other computing nodes, and is able to remove access thereto at any time.

For example, the processing means may be configured to re-encrypt the data package or the symmetric cryptographic key in response to a request by the user, or at a predetermined time after the data package is transmitted to the further computing node, or once a further encrypted data package is received from the further computing node.

The data package may be encrypted using an Advanced Encryption Standard (AES) algorithm. The symmetric cryptographic key may be encrypted using an elliptic-curve encryption (ECC) algorithm. It will of course be appreciated however that any suitable encryption methods may be used.

A further aspect of the present disclosure provides a method of controlling access to data shared on a distributed communications network, the method comprising providing a first computing node comprising data, one or more cryptographic keys and computational logic defined by a set of rules of the distributed communications network, generating, at the first computing node, a data package to be shared in dependence on at least a portion of the data and the computational logic, encrypting, at the first computing node, the data package using a symmetric cryptographic key, encrypting, at the first computing node, the symmetric cryptographic key using a public cryptographic key of a public-private key pair, and transmitting, from the first computing node, the encrypted data package and the encrypted symmetric cryptographic key to a further computing node.

As such, a method is provided whereby encrypted data may be shared between two nodes provided that the computational logic, that is the rules of the communications network, allow for said data to be shared between the nodes. The pre-defined rules control how a participant of the network (i.e., each computing node) is able to behave on the network, that is, with whom they are able to communicate and on what basis (e.g., what types of data can be shared), whilst at the same time giving the participant complete control over their data. The pre-defined rules are preferably published to a blockchain ledger as a network protocol ledger to ensure it is immutable, traceable and easily distributed. This ensures that the rules are enforced and ensures that the participants comply with the pre-defined behaviour.

In some arrangement, the computational logic may be determined based on a role allocated to a user of the computing node. That is to say, the rules of the communications network may allow data sharing between nodes that are associated with participants having a certain defined role. For example, in the context of a healthcare network, the computational logic may be defined such that data may only be shared between participants having a role defined as "patient" and "healthcare provider".

The method further may further comprise receiving the public cryptographic key from the further computing node. The further computing node may comprise the private cryptographic key of the public-private key pair for decrypting the encrypted symmetric cryptographic key. In doing so, the first computing node is able to securely share data with the further computing node using the public key of the further computing node, wherein only the further computing node can access the shared data using their respective private key.

The method may further comprise receiving, at the further computing node, the encrypted data package and encrypted symmetric cryptographic key.

In such arrangements, the method may further comprise decrypting, at the further computing node, the encrypted symmetric cryptographic key using the private cryptographic key of the public-private key pair, decrypting, at the further computing node, the encrypted data package using the decrypted symmetric cryptographic key, and outputting, from the further computing node, the data contained within the data package for use.

In some arrangements, the method may further comprise re-encrypting, at the first computing node, the symmetric cryptographic key associated with a data package transmitted to the further computing node, such that the further computing node is unable to access the encrypted data package. Likewise, the method may further comprise re-encrypting, at the first computing node, the data package transmitted to the further computing node using a different symmetric cryptographic key, such that the further computing node is unable to access the encrypted data package. In doing so, the first computing node has complete control over the data shared with the further computing node, and is able to remove access thereto at any time.

For example, the re-encrypting may be performed in response to a request by the user, or at a pre-determined time after the data package is transmitted to the further computing node, or once a further encrypted data package is received from the further computing node.

The data package may be encrypted using an Advanced Encryption Standard (AES) algorithm. The symmetric cryptographic key may be encrypted using an elliptic-curve encryption (ECC) algorithm. Again, it will be appreciated that any suitable method of encryption may be used.

BRIEF DESCRIPTION OF THE DRAWINGS

The present disclosure will now be described by way of example only with reference to the accompanying drawings in which.

DETAILED DESCRIPTION

The present disclosure provides a distributed communication network comprising a plurality of computing nodes assigned to each participant of the network and a method of controlling access to data shared on said network. The computing node operates according to a set of pre-defined rules to control how a participant is able to behave on the network, that is, with whom they are able to communicate and on what basis, whilst at the same time giving the participant complete control over their data.

Overview of the Network

Figure 1:
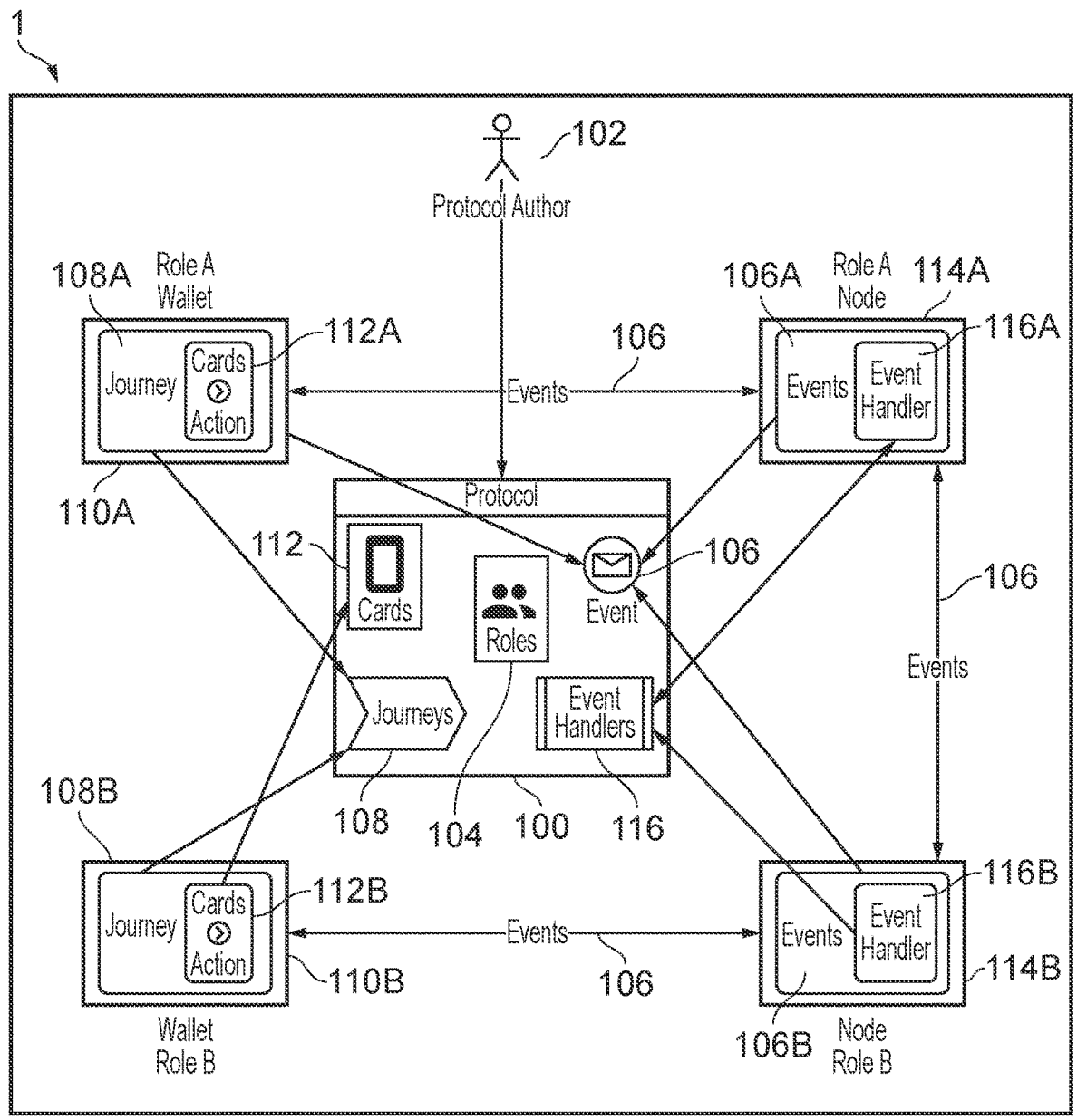
FIG. 1 is a block diagram illustrating a distributed communications network in accordance with the present disclosure.

FIG. 1 illustrates the overall network 1 in accordance with the present disclosure. The network 1 is based around one or more network protocols 100 that define the entities of the network 1 and the behaviour of these entities. The network protocol(s) 100 not only specify the rules for the network 1 but also enforces the rules on the participants to ensure it complies with the pre-defined behaviour. The network protocol 100 is published to a blockchain ledger (not shown) to ensure it is immutable, traceable and easily distributed. Any changes to the network protocol 100 (i.e., to the rules or the roles defined by the protocol) require the participants of that protocol 100 to agree to those changes, before the updated protocol 100 is again published to the blockchain ledger. In this regard, once a new version of the protocol 100 has been published, each participant may be given the option of accepting the changes. If they accept the changes, they will operate according to the new rules. If they do not accept the changes, they will continue to operate according to the previous set of rules, however, they will not be able to participate in any events that are governed by the new set of rules. For example, if the new rules define a new role and the allowed relationships with existing roles, the participant will not be able to communicate with participants having the new role if they do not accept the new rules associated with this new role. Alternatively, or in addition to the above, the participants may be required to vote to accept a new protocol 100, with a pre-defined majority being required before the new protocol 100 can be published to the blockchain and implemented. Any participant that voted against the new protocol 100 may then be given the option to not accept the new protocol 100 and continue to operate according to the previous version. Each protocol 100 is created by an author 102, for example, in the context of a healthcare network, the author 102 of the protocol 100 may be the administrator of a hospital that sits at the centre of the healthcare network.

The network protocol 100 is used to govern the overall network 1 by defining the network participants, the "roles" 104 of those participants, and a set of rules that define the relationships between the different roles 104. For example, in the context of a healthcare system, the roles 104 may include patient, general practitioner, physiotherapist, dental practice, psychiatrist, hospital, and insurance provider. The relationships between the different roles 104 are defined by a set of rules that dictate what communications can take place (referred herein as "events" 106) and between who (referred herein as "journeys" 108). The participants in the network 1 are tied to these rules by the protocol 100 and cannot deviate therefrom, as will be described in more detail below.

The events 106 exchanged between participants of the network 1 are also all saved to the blockchain ledger in order to provide a traceable and immutable log of all interactions between the participants of the network 1. In some applications, this can serve as particularly useful for performing audits and resolving disputes since every interaction between two or more parties is automatically logged in chronological order.

Each participant accesses the network 1 via an application (referred herein as a "wallet" 110A-B), with an underlying application programming interface (API), which provides a user interface to allow the user to communicate with other participants. It will of course be appreciated that the wallet 110A-B may be accessed via any suitable device, for example, via an application on a smartphone, tablet computer or other mobile device, or via a web browser one a computing device.

Each wallet 110A-B will hold one or more data objects (referred herein as "cards" 112A-B) that are used to initiate and exchange events with other participants. The event cards 112A-B may comprise any readable data but are encrypted such that only participants with the necessary cryptographic keys can read that data upon receipt of the card 112A-B. In this regard, the protocol 100 will include rules defining which participants may be provided with the cryptographic keys for any given card 112. The cryptographic keys for accessing the cards held by a wallet 110A-B are stored in the wallet 110A-B, along with the rules defined by the protocol 100 for the role 104 of the respective participant. For example, if the owner of the wallet 110A-B is a patient, the wallet 110A-B will store the rules that define which other participants a patient can interact directly with (e.g., a GP, a hospital, etc.), what data a patient can exchange with those participants and a private-public key pair for encrypting and decrypting events initiated at the wallet 110A-B.

Each wallet 110A-B is paired with a cryptographically protected computing node 114A-B within the network 1, which facilitates all communications between different participants, within the rules of the protocol 100 of the network 1. That is to say, each participant has their own computing node 114A-B on the network 1 for communicating with other participants via the wallet API. It will be appreciated that each wallet 110A-B may be connected to multiple networks, the wallet 110A-B being paired with one node 114A-B on each network 1. Each node 114A-B will have an assigned role according to the role of participant within the given network 1. The protocol 100 will thus define which nodes 114A-B are allowed to pair with each other for data exchange based on the assigned role, as well as which cards 112A-B can be exchanged between each allowed pair of nodes 114A-B (i.e., which events 106 can take place). In this respect, the computing nodes 114A-B store the rules for processing incoming events (referred herein as "handlers" 116), in particular, whether they are permitted to process such events 106, who they can receive such events 106 from (i.e., nodes 114A-B having a certain assigned role) and how to then process those events 106 (i.e., which cryptographic keys are needed to access the information stored on the received card 112A-B). As such, even though all events 106 are recorded on the blockchain ledger, communications 106 between certain participants is protected from other participants that do not have the permissions or keys required to access those events 106. For example, participants with role C do not have access to the logic needed to access communications 106 between participants with roles A and B.

Figure 2:
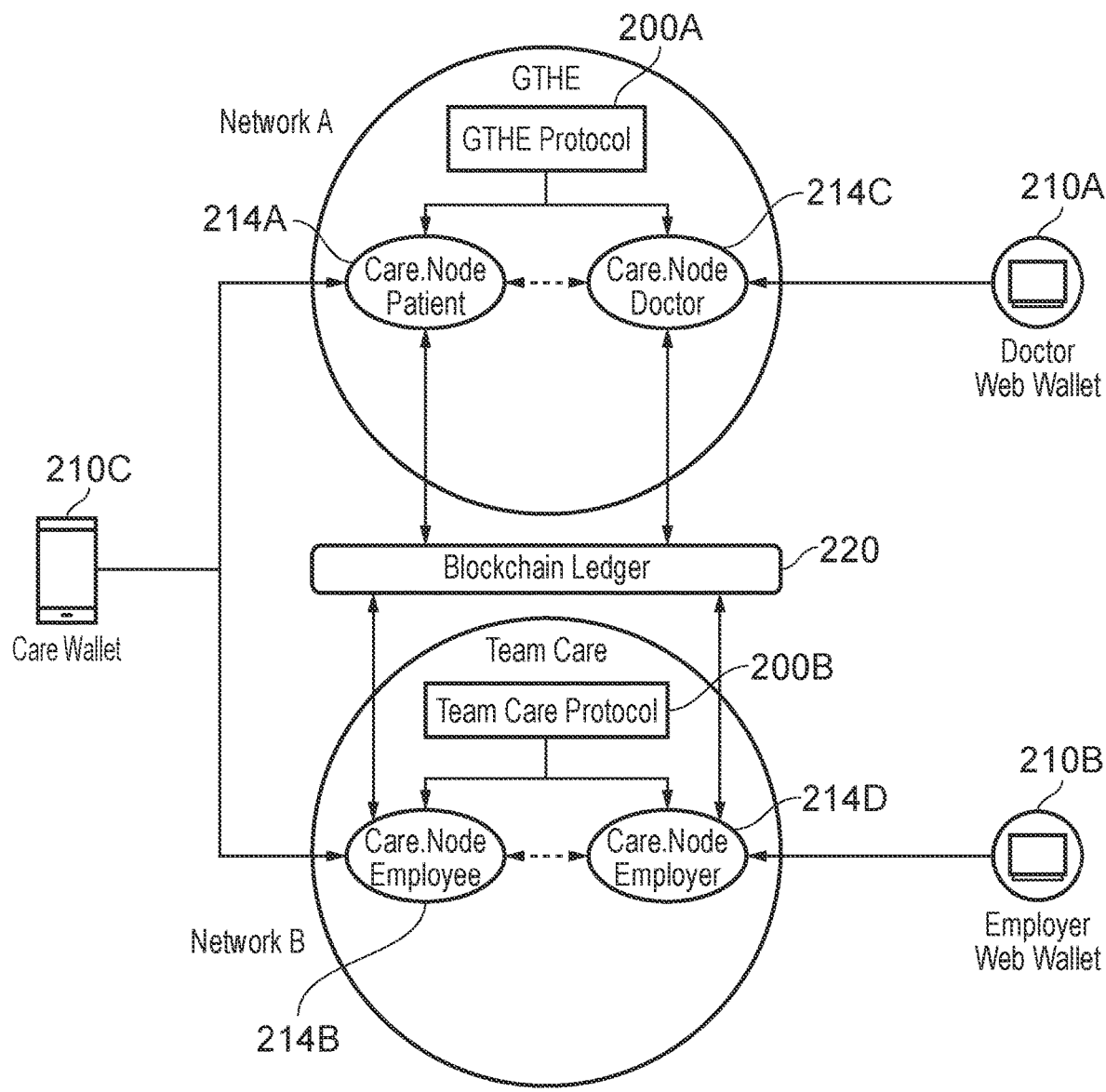
FIG. 2 is a block diagram illustrating a system comprising multiple distributed communication networks in accordance with the present disclosure.

FIG. 2 illustrates how a user may be part of multiple networks A and B, each with its own defined protocol 200A, 200B. The user has its own wallet 210C that it accesses via the API, the wallet 210C being connected to both networks A and B via respective nodes 214A, 214B. The user is part of a first Network A, which is healthcare network for patients and healthcare professionals. Network A has its own protocol 200A that defines the roles of the participants within the network and the rules of the interactions therebetween. As described above, the protocol 200A is published to a blockchain ledger 220 such that it is immutable, traceable and easily accessed. In this network A, the role of the user is defined as a patient, and so the user wallet 210C is paired with a patient node 214A that operates according to the rules of the protocol 200A of Network A, for example, by communicating with a doctor node 214C. As described above, interactions between the patient node 214A and the doctor node 214C are also saved to the blockchain ledger 220 to provide an immutable and traceable log of their interactions.

Similarly, the user is part of a second Network B, which is network for the user's place of employment. Network B also has its own protocol 200B that defines the roles of the participants within the network B and the rules of the interactions therebetween, the protocol 200B again being published to a blockchain ledger 220 such that it is immutable, traceable and easily accessed. In this network B, the role of the user is defined as an employee, and so the user wallet 210C is paired with an employee node 214B that operates according to the rules of the protocol 200B of Network B, for example, by communication with an employer node 214D. Likewise, interactions between the employee node 214B and the employer node 214D are also saved to the blockchain ledger 220 to provide an immutable and traceable log of their interactions.

Further details of the structure and function of the computing nodes will now be described.

Overview of the Computing Nodes

The computing nodes are a core component of the network. Each node can connect to the wallet of the participant and other nodes in the network to exchange the events (i.e., communications). The computing nodes will process the incoming events, find and execute the rules for the incoming events and generate subsequent events. Each participant is assigned a computing node in each network, data associated with the participant being stored securely in a node vault. Once a participant has been assigned a node-wallet pairing, the node cannot be assigned to anyone else.

The node however can be linked to any computer server, that is to say, the computing node does not necessarily need to sit on the computing device on which the wallet API is being operated and can float between different servers. As such, the computing node may be operated from any geographic location, within any limits that may be set by the network protocol. For example, in the context of a healthcare network, the protocol may limit the nodes to the country in which the healthcare services are located. However, this does mean that in cases where a large computational power is required to process any event or a server is particularly busy, the computing node can be sent to a server with greater processing capacity to improve the speed at which events can be exchanged. Indeed, the node can be temporarily duplicated and distributed between multiple servers to improve the speed at events can be exchanged. For example, a large health organisation may need to send a very large number of communications to all patients in its records, and so by duplicating its node and distributing it between different computing servers, all outgoing communications can be sent quickly and in parallel, and any incoming communications can also be processed with increased speed. The computing nodes can thus be moved around as required to the most optimal computing space.

As discussed above, each computing node follows the network protocol to identify the roles, relationship, events and rules for each event. Upon receiving a card initiating an event, the node reads a node protocol file to validate the event, find the event rules and determine what event should be initiated in response according to the rules of the relationship between the two nodes.

Each node also has a specific role assigned to it, based on the identity of the user. For example, the node could be patient node, doctor node, employee node or employer node. Each node processes, executes and saves events based on its role within network. It will be appreciated that any suitable role may be defined, depending on the industry in which a network is being implemented (e.g., health, logistical, retail, education and the like).

Figure 3:
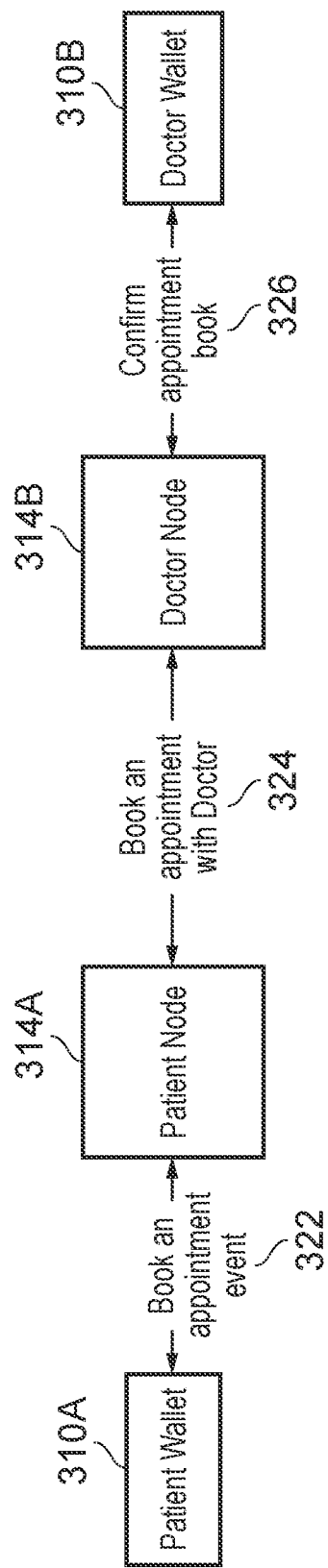
FIG. 3 is a block diagram illustrating a mode of communication in accordance with the present disclosure.
Figure 4:
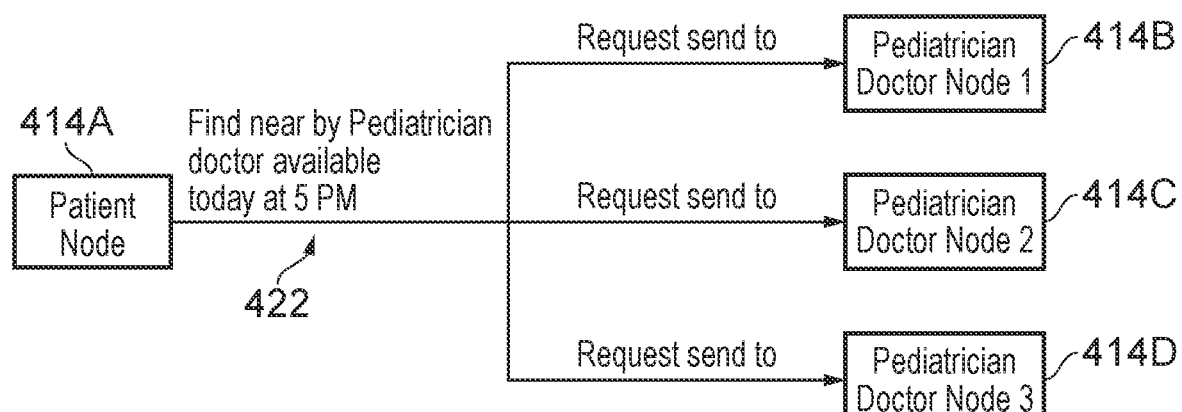
FIG. 4 is a block diagram illustrating a further mode of communication in accordance with the present disclosure.

FIGS. 3 and 4 illustrate examples of the different types of events that can take place, in the context of a healthcare network, based on the defined roles.

FIG. 3 illustrates a node-to-node communication, in which one event is sent from one node to another. In this example, a patient would like to book an appointment with a specific doctor. The patient has access to a patient wallet 310A that is assigned to a patient node 314A within the network, wherein the patient node 314A operates according to the pre-defined rules of the protocol that are specific to the role of patient. Likewise, the doctor has access to a doctor wallet 310B that is assigned to a doctor node 314B, wherein the doctor node 314B operates according to the pre-defined rules of the protocol that are specific to the role of doctor. In use, the patient initiates an event 322 via the patient wallet 310A such as booking an appointment or checking availability. The patient node 314A processes the incoming event 322 and generates an outgoing event 324 based on the role-specific rules. For example, the patient node 314A may receive a request 322 to book an appointment, confirm that this is a permitted event between a patient node 314A and a doctor node 314B, and then generate an outgoing event 324 requesting the appointment to the doctor node 314B. Upon receipt of the event 324 incoming from the patient node 314A, the doctor node 314B will then process the event 324 according to its own set of rules and generate an outgoing event 326 to the doctor wallet 310B so that the appointment request can be processed by the owner of that wallet 310B (i.e. the doctor).

FIG. 4 illustrates a node-to-role communication, in which a node 414A sends an event 422 to all nodes 414B-D with a specified role. For example, a patient is searching for a paediatric doctor that is available at 5 pm. The event is received at the patient node 414A via the patient wallet (not shown), the patient node 414A generating and transmitting an event 422 to all doctor nodes 414B-D within the network that are defined as being paediatric doctors. As before, each of the doctor nodes 414B-D will then process the event 422 according to the pre-defined rules for that given role, and send a subsequent event back to the patient node (for example, confirming availability or unavailability).

Figure 5:
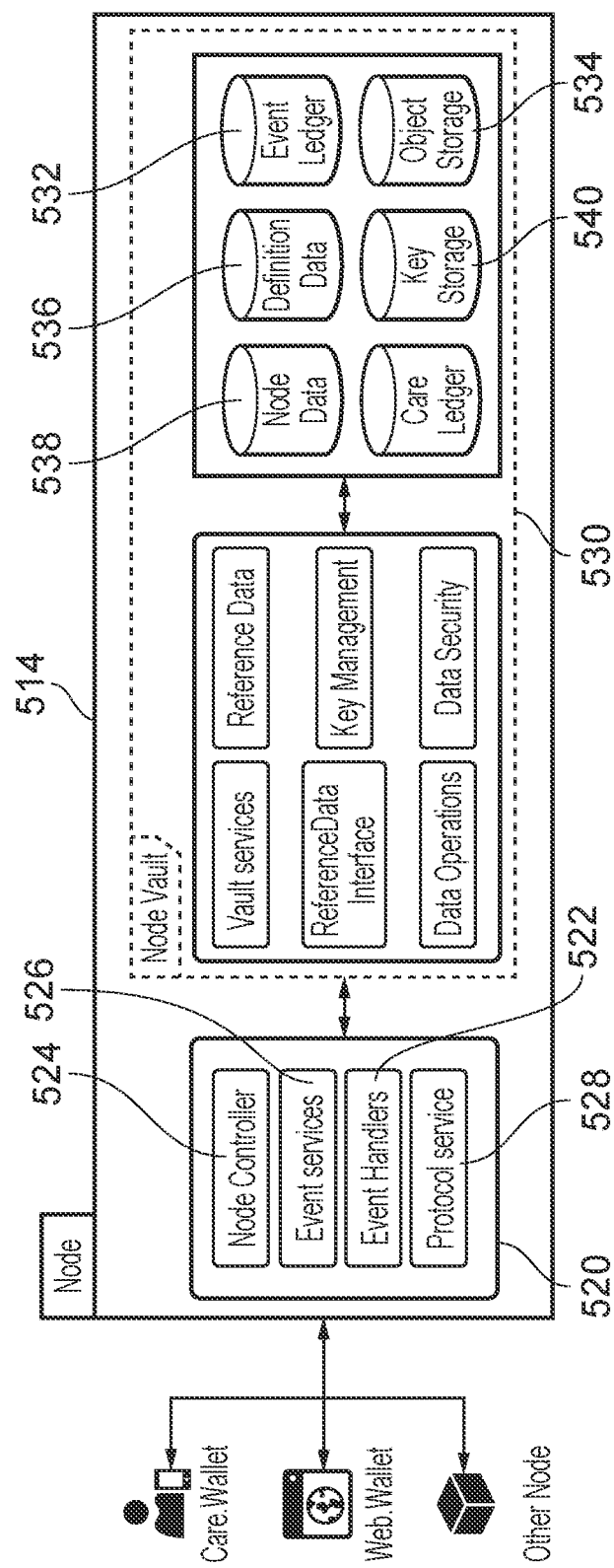
FIG. 5 is a block diagram illustrating computing node for use in a distributed communications network in accordance with the present disclosure.

FIG. 5 illustrates the components of a computing node 514 according to the present disclosure. The node 514 stores various different data and programs for processing and executing the incoming and outgoing events. In this respect, the nodes 514 comprise the computational logic 520 associated with the role specific rules (the "event handlers" 522) for processing incoming and outgoing events, as defined by the protocol for the network. The computational logic 520 also includes a node controller 524 for controlling the processing carried out by the node 514, event service program 526 for processing incoming and outgoing events, and a protocol service program 528 for carrying out actions relating to the rules defined by the protocol. Each node 514 also comprises a node vault 530, which stores a record of every event generated and received by the node 514 (e.g., in event ledger 532), all transactional events and the associated payloads (e.g., object storage 534), the role-specific rules (i.e. the computational logic for each permitted event) for that node 514 (e.g., definition data storage 536), and any other data needed for processing events according to the pre-defined rules of the protocol (e.g., node data storage 538. The vault also stores (e.g., in key storage 540) the cryptographic keys for encrypting and decrypting events generated by the node 514, as well as the cryptographic keys needed for controlling access to the data within events generated by the node 514, as will now be described.

Security Features of Node

As discussed above, "data" in the context of the present disclosure is redefined as the information being shared as a payload, transparent computational logic needed to process that payload, the role of participants involved and the consent to process the payload. To achieve this, normal symmetric encryption is largely inadequate. To solve this problem, a novel encryption approach is used that asserts the role over the data payload, provides control over access and the ability to maintain context and ownership of data even after data has been shared with another party.

In the present disclosure, a combination of hashing, asymmetric and symmetric encryption is used to achieve decentralized communication and contextual use of data between two parties, defined by their respective roles and enforced by the logic stored in their respective nodes.

As described above, every data event is linked to a to specific role pair (A-B), where node A is sending a message/event to node B. Hashing is used to control event exchange between the sender and receiver node, for example, using the hash algorithm KECCKK256 to verify the identity of sender (A) and receiver (B), which then establishes their respective roles and permitted uses of data according to those roles. In this respect, every shared data payload (i.e., event) is uniquely linked to a role pair (A-B), which also defines a unique context and the rules of the relationship, that is to say, computational logic that governs data access and permitted use by the respective parties.

Figure 6:
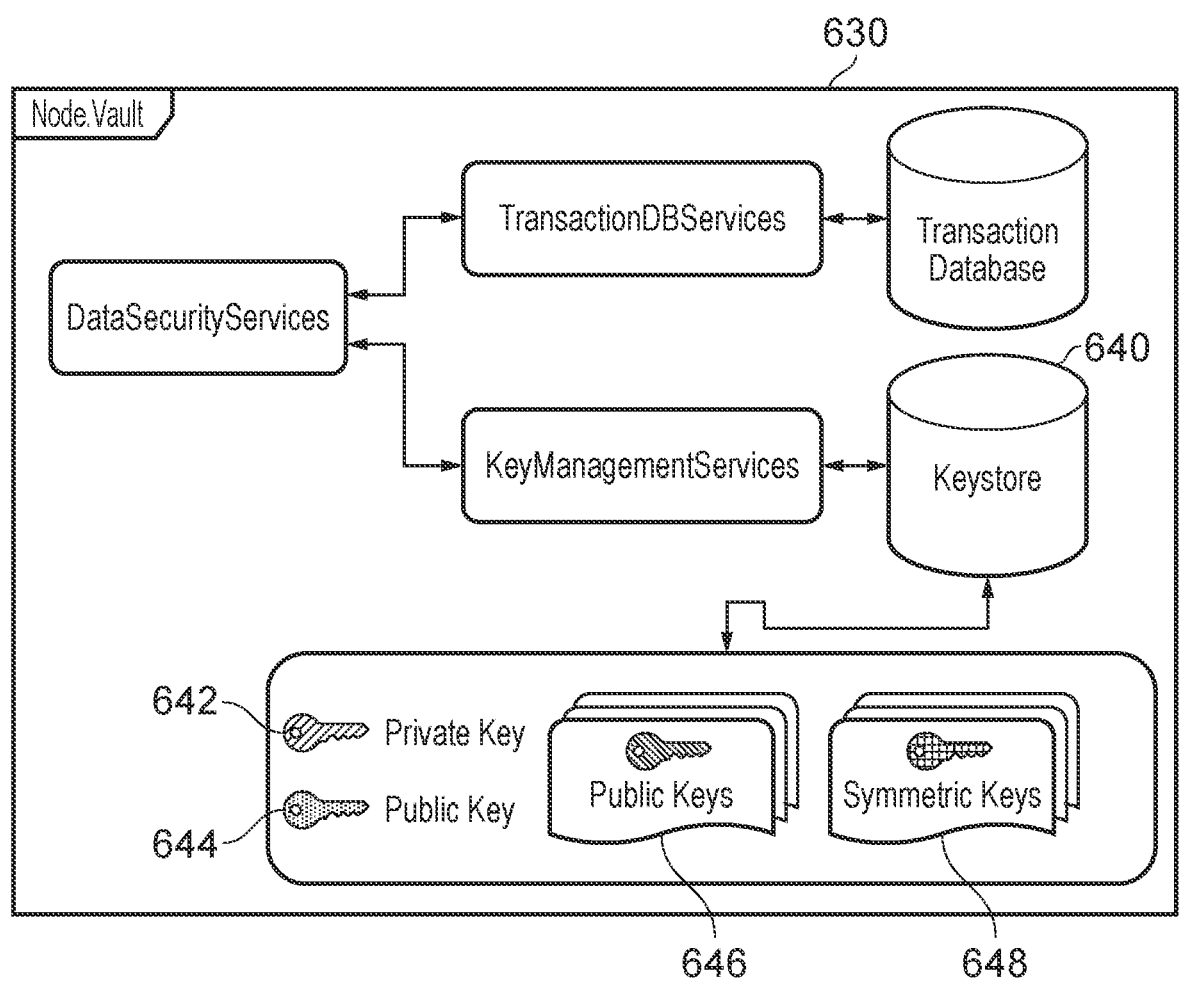
FIG. 6 is a block diagram illustrating part of a computing node in accordance with the present disclosure.

Symmetric encryption is used to protect private payload data within an event (for example, in a transaction), such that the payload data is only accessible with the private cryptographic keys 642 of the owners. The payload data in the node vault 630 is thus encrypted using symmetric encryption, whereby the private cryptographic key 642 used for encrypting and decrypting events are stored 640 within the node vault 630, as further illustrated by FIG. 6. For example, the event may be encrypted using an Advanced Encryption Standard (AES) algorithm.

In order to share the encrypted event, the receiver also needs access to the symmetric cryptographic key 648, so this also needs to be shared in a secure way. To do this, the symmetric cryptographic key 648 is further encrypted using asymmetric encryption, for example, using elliptic-curve encryption (ECC) such as an elliptic curve discrete logarithm problem (ECDLP) algorithm. As will be described in more detail below, when an encrypted transaction event is sent to another node, the receiving node is only able to access the symmetric cryptographic key 648 needed to decrypt the payload data if it has been encrypted by the sending node using the public key 646 of the receiving node. In this respect, the node vault 630 will store its own public key 644, which it can share with other trusted nodes to allow said nodes to send encrypted transaction events with a symmetric cryptographic key that is encrypted using the public key 644. It will also store the public keys 646 of other nodes so that it can send encrypted transaction events with a symmetric cryptographic key that is encrypted using the public key 646 of another node, so that said node can access the symmetric cryptographic key.

To assert control of the access to the payload data, the node encrypts and re-encrypts the payload data within the node vault 630, preferably, every time a node-to-node communication event takes place. In doing so, an increased level of security to the data within the vault is provided, such that even if a third party was able to access the private key 642 used to encrypt the data within the vault 630, the data would be re-encrypted and the private key 642 will have randomly changed before a malicious attacker could cryptographically shred the key.

Furthermore, if the sender wants to "un-share" the event data that has been shared with the receiver, the node can remove access to the symmetric cryptographic key 648 used to encrypt the shared data by re-encrypting the payload data with a different symmetric cryptographic key 648, thereby breaking the relationship between the symmetrically encrypted data and the asymmetrically encrypted key. It may do this for a specific communication event with a particular receiver, or for all communication events that have taken place with the receiver. As such, the sender is provided with significant control over the access to their data and the permitted use of said data, even when the data is in the custody of another party. In this respect, once data has been shared with another party, only the wallet application of that party has the computational logic required to read the de-crypted data (i.e., the event cards) and render it for display to the user. In this respect, every encrypted event card is shared on the network as a hash, with only the wallet application having the computational logic needed to read this data structure. As such, the data contained within the event cannot be retrieved outside of the wallet. Even if a third party was to attempt to reproduce the information rendered by the wallet application (e.g., by taking a picture of the interface), this would merely provide them with some information and not the actual data itself.

EXAMPLES

Figure 7:
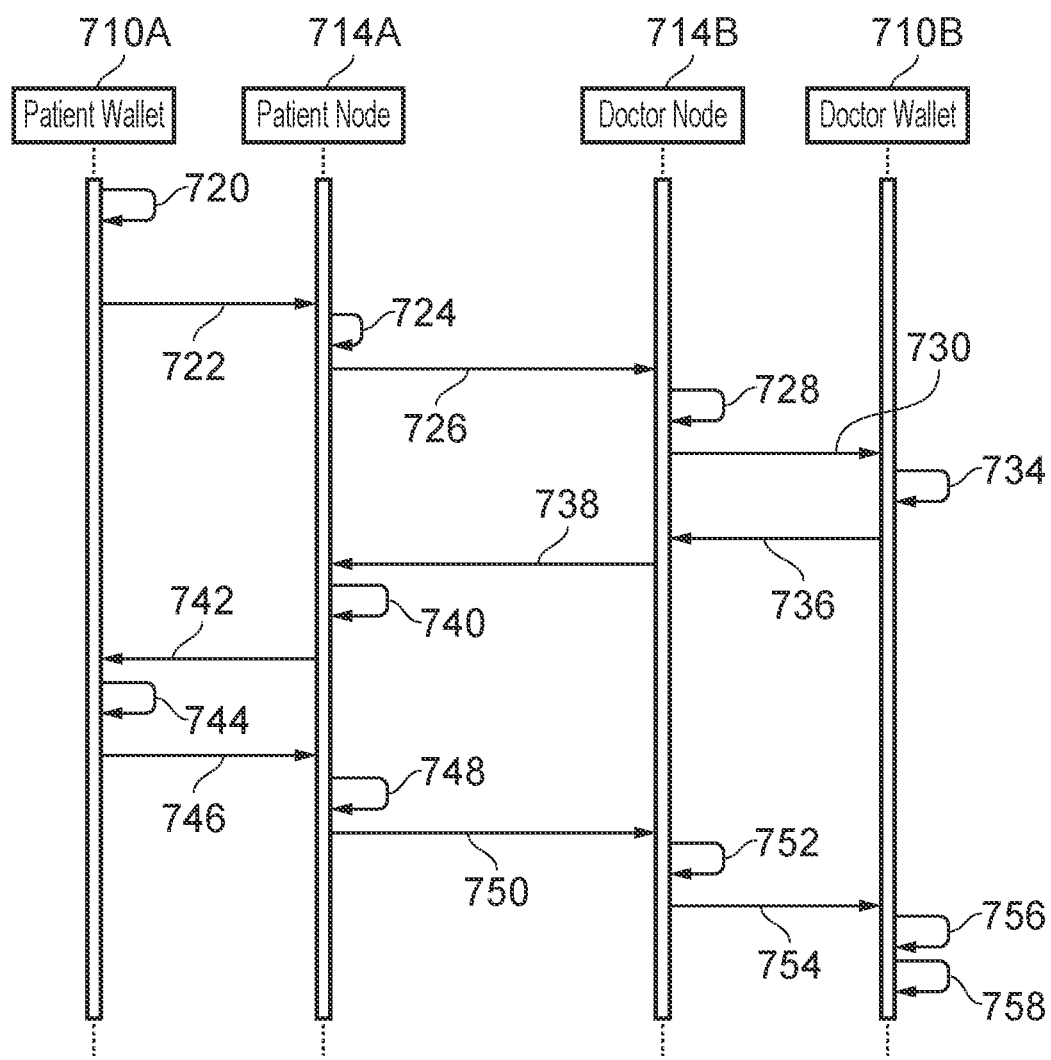
FIG. 7 is an example sequence diagram of communications between some of the entities of a distributed communications network in accordance with the present disclosure.

In use, the nodes receive events incoming from the user wallet (i.e. events initiated by the user) or the blockchain ledger (i.e. events incoming from another participant). FIG. 7 illustrates an example of node-to-node communication, in which the data being shared (i.e., the payload of the event) is private and belongs to one of the participants. In the example, the participants are a patient and a doctor within a healthcare network.

Figure 8:
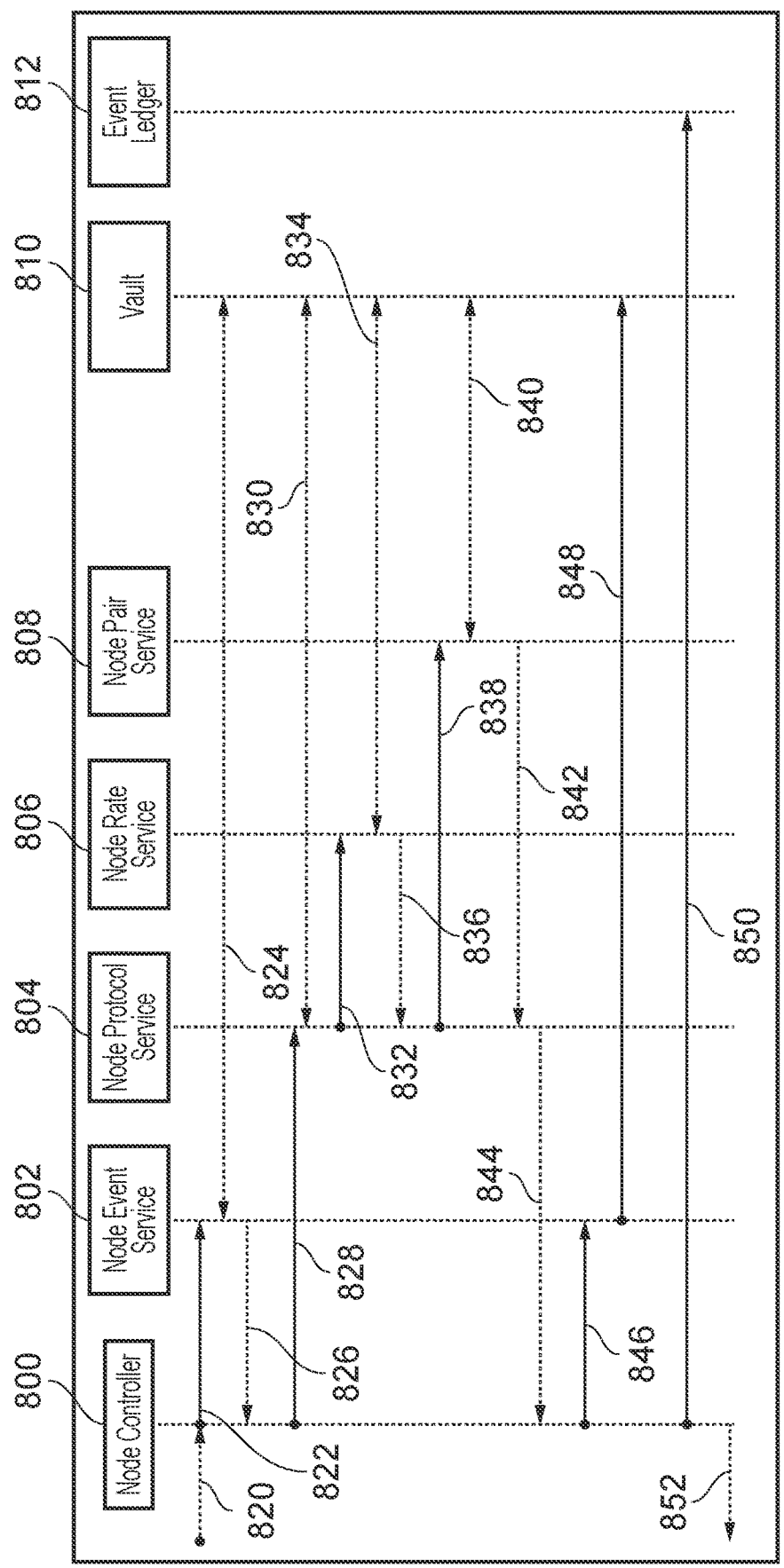
FIG. 8 is an example sequence diagram of processing carried out by an entity of a distributed communications network in accordance with the present disclosure.

At step 720, a first event is generated at the patient wallet 710A, wherein the first event comprises a private payload (for example, a request for an appointment or access to health records) that is encrypted using a symmetric cryptographic access key, as described above. The first event is then sent to the patient node 714A as an event card at step 722, wherein the first event is parsed so as to obtain the event metadata required to process the event at step 724, as illustrated in FIG. 8 by way of example. The event metadata may include the event type, an event ID, a timestamp, and the event target (e.g., a particular participant, or a particular role or roles). To obtain the required event data, the event will first be received at the node controller 800 at step 820. The node controller 800 will invoke the event services program 802 to obtain the event metadata at step 822, which will obtain information regarding the definition of the event from a vault 810 at step 824. Once the event definition has been sent back to the controller 800 at step 826, the node controller 800 will invoke the protocol service program 804 at step 828 by pulling a copy of the protocol from the vault 820 at step 830. Once the protocol has been received, the protocol service program 804 will invoke a node role service program 806 to obtain a definition of the node role from the vault 810 at steps 832 and 834 in order to execute the rules for that given role (e.g., patient). Once the node protocol service program 804 has received the details of the node role at step 836, it will invoke a node pair service program 808 at step 838 to obtain details of roles that it can pair with, that is to say, which other roles within the network that the node is permitted to communicate with according to the protocol. The node pair service program 808 will obtain this information from the vault 810 at step 840 and communicate it back to the node protocol service program 804 at step 842. The protocol service program 804 will send a distribution list back to the node controller 800 at step 844, the distribution list comprising a list of nodes that the patient node 714A is permitted to communicate with (i.e., exchange events). The node controller 800 will then instruct the node event service program 802 to store the event metadata including the distribution list in the vault at steps 846 and 8468, and store the same information in the event ledger 812 at step 850.

If the pre-defined rules of the network protocol allow a patient to send that type of event to the intended recipient (in this case, a doctor) (e.g., at step 852 of FIG. 8), then the patient node 714A will send the first event to the doctor node 714B at step 726, the first event also being saved to the blockchain ledger.

The doctor node 714B will process the first event in a similar way at step 728, and provided it complies with the rules of the protocol, will send the first event to the doctor wallet 710B at step 730. Upon determining that the first event comprises an encrypted payload at step 734, a request for the cryptographic key needed to access the private payload will be sent back to the patient node 714A via the doctor node 714B as a second event at step 736 and 738. The patient node 714A will receive and process the second event at step 740 using the role specific rules of the protocol, and then send the second event to the patient wallet 710A at step 742 to confirm whether the access key can be shared with the requester (i.e., the doctor) at step 744. If consent is given, the symmetric cryptographic key will be encrypted using the public key of the doctor node 714A at step 746, as will be described in further detail below. A third event card will then be generated and sent to the patient node 714A at step 748, the third event comprising the encrypted symmetric key for accessing the encrypted payload. This third event is then sent to the doctor wallet 710B via the doctor node 714B at steps 750-756, wherein the doctor node 714B uses its private key to decrypt the symmetric key at step 752, which can then be used to decrypt and view the payload data at step 758.

Once the payload has been shared and accessed by the recipient (i.e. the doctor), the pre-defined rules of the patient wallet 710B may store logic instructing the patient node 714A to remove access at a pre-determined time, that is, to re-encrypt the symmetric cryptographic key and thereby break the relationship between the encrypted data and the encrypted access key. Alternatively, the logic may instruct the patient node 714A to remove access once a communication event has been received from the doctor node 714B, for example, in the form of an answer to a request in the initial event.

Figure 9:
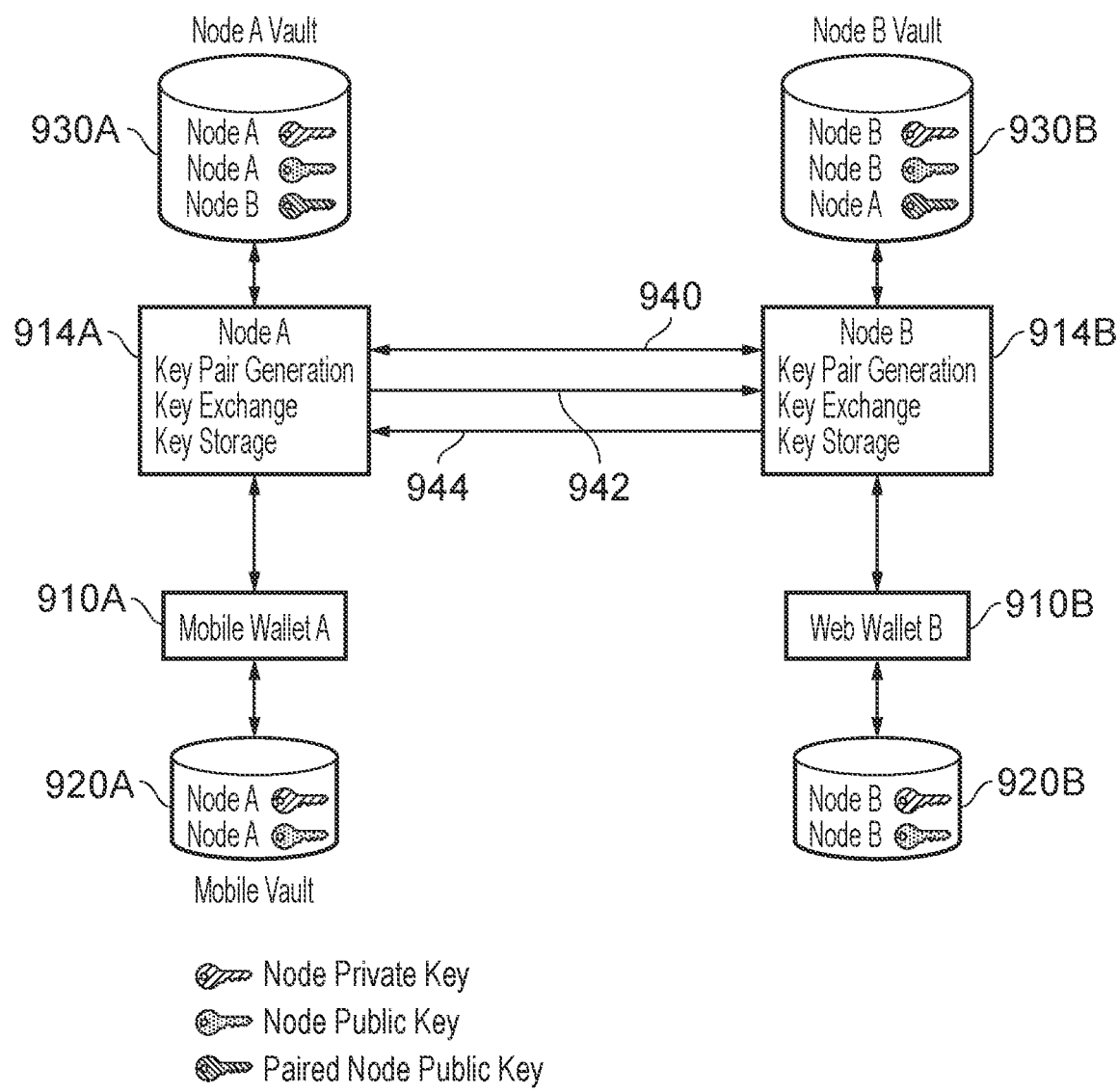
FIG. 9 is a block diagram illustrating part of a distributed communications network in accordance with the present disclosure.

FIG. 9 further illustrates node-to-node communication, wherein a node A (914A) is paired with a node B (914B) for sharing events having a private payload. Before any events are shared between the two nodes 914A, 914B, each node 914A, 914B will first confirm using the pre-defined rules for their assigned roles that they are authorised to share events. For example, if Node 914A is assigned a patient role and Node 914B is assigned a doctor role, each respective node 914A, 914B will check using the protocol description stored in the vault 930A, 930B that they are permitted to share events with the other. The two nodes 914A, 914B will then exchange public keys (shown generally by arrow 940). As described above, each node vault 930A, 930B will comprise a private-public key pair for use in protecting the symmetric keys used to encrypt event payload data. Node 914A will therefore generate a paired node public key that is associated with its private key, and send this to node 914B. Node 914B will then store Node 914A's public key in its vault 930B Likewise, Node 914B will generate a paired node public key that is associated with its private key, and send this to node 914A. Node 914A will then store Node 914B's public key in its vault 930A.

An event card may then be initiated by Wallet 910A and sent to node 914A for encryption. Here the event card is encrypted using a symmetric cryptographic key. The symmetric cryptographic key is then encrypted using the public key of Node 914B and digitally signed by the private key of Node 914A (of the exchanged private-public key pair). The encrypted event card and encrypted symmetric key are then sent to Node 914B (shown generally by arrow 940). The encrypted symmetric key is verified using the public key of Node 914A and decrypted using the private key of Node 914B. The decrypted symmetric key can then be used to decrypt the event card, which can then be sent to Wallet 910B for use by the owner of Wallet 910B. As noted above, the event cards are shared as hash, and only the wallets are cable of processing the hash and rendering the event data into a format for viewing by a user. As such, the only way for the owner of Wallet 910B is to render the information using the wallet application.

In response, the event card may be edited by Wallet 910B and sent to node 914B for encryption. Here the event card is again encrypted using symmetric encryption, with the symmetric key being encrypted by the public key of Node 914A and digitally signed by the private key of Node 914B. The encrypted event card and encrypted symmetric key are then sent to Node 914A (shown generally by arrow 944). The encrypted symmetric key is verified using the public key of Node 914B and decrypted using the private key of Node 914A. The decrypted symmetric key can then be used to decrypt the event card, which can then be sent to Wallet 910A for use by the owner of Wallet 910A.

If the owner of Node 914A decides that they want to terminate the relationship with Node 914B, Node 914A can trigger an event requesting that the public key shared with Node 914B is terminated. Similarly, Node 914A can re-encrypt any events that have been shared with Node 914B, to thereby break the relationship between the symmetric and asymmetric encryption, such that the symmetric keys in the custody of Node 914B can no longer be used to access the encrypted events. As such, Node 914A can effectively un-share the data that has be shared with Node 914B, providing complete control over their data.

Figure 10:
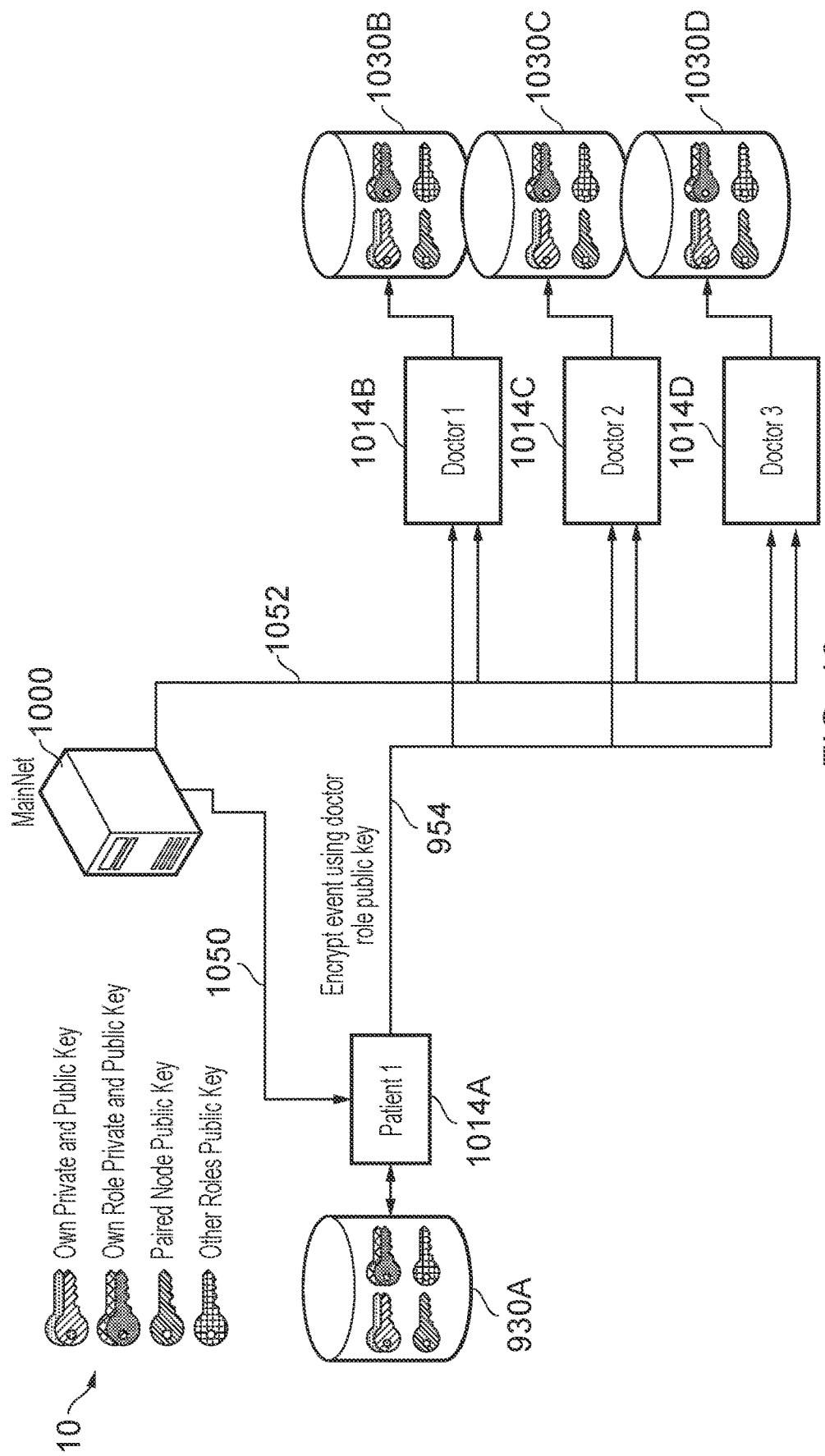
FIG. 10 is a block diagram illustrating part of a distributed communications network in accordance with the present disclosure.

Similarly, as illustrated by FIG. 10, a role specific key pair may be generated, for example, by the administrator of the network 10 at a central server 1000, with the key pair being provided to a node vault 1030A-D when that node 1014A-D is assigned a given role. For example, a patient-doctor key pair may be generated and provided to all nodes 1014A-D having the role of patient or doctor, such that encrypted events and the symmetric keys used to encrypt said events can be securely shared between nodes 1014A-D having those roles using that key pair. As such, once the administrator server 1000 has generated the patient-doctor key pair, it may be distributed (1050) to the patient node 1014A, and distributed (1052) to any doctor nodes 1014B-D within the network 10. The patient node 1014A may then use the doctor role public key to encrypt an event and send the encrypted event (shown generally at 954) to the doctor nodes 1014B-D. Each of the doctor nodes 1014B-D can then decrypt the event using the doctor role private key. Likewise, the doctor nodes 1014B-D may encrypt an event using a patient role public key and send the encrypted event back to the patient node 1014A, where it can be decrypted using the patient role private key. It will of course be appreciated that the role specific public-key pairs may be applied to any role defined within the protocol associated with any network.

Various modifications, whether by way of addition, deletion and/or substitution, may be made to all of the above described embodiments to provide further embodiments, any and/or all of which are intended to be encompassed by the appended claims.

The invention claimed is:

1. A distributed communications network comprising a plurality of computing nodes, wherein each computing node comprises:
   a storage means comprising data, one or more cryptographic keys and computational logic defined by a set of rules of the distributed communications network, wherein the computational logic of each computing node is determined based on a pre-defined role allocated to a user of the computing node, the computational logic at least defining (i) one or more roles associated with further computing nodes with which data sharing is permitted, and (ii) one or more types of data to be shared with each of the one or more roles; and
   a processing means configured to:
      generate a data package to be shared in dependence on at least a portion of the data and the one or more types of data defined by the computational logic,
      encrypt the data package using a symmetric cryptographic key; and
      encrypt the symmetric cryptographic key using a public cryptographic key of a public-private key pair; and
   a transmitting means configured to transmit the encrypted data package and the encrypted symmetric cryptographic key to at least one further computing node in dependence on the one or more roles defined by the computational logic.

2. A distributed communication network according to claim 1, wherein the storage means of the further computing node comprises the private cryptographic key of the public-private key pair for decrypting the encrypted symmetric cryptographic key.

3. A distributed communication network according to claim 1, wherein each computing node further comprises a receiver means configured to receive encrypted data packages and respective encrypted symmetric cryptographic keys from a further computing node.

4. A distributed communication network according to claim 3, wherein the processing means is further configured to:
   decrypt the encrypted symmetric cryptographic key using a private cryptographic key of a public-private key pair stored in the storage means;
   decrypt the encrypted data package using the decrypted symmetric cryptographic key; and
   output the data contained within the data package for use.

5. A distributed communication network according to claim 1, wherein the processing means is configured to re-encrypt the symmetric cryptographic key associated with a data package transmitted to a further computing node, such that the further computing node is unable to access the encrypted data package.

6. A distributed communication network according to claim 1, wherein the processing means is configured to re-encrypt the data package transmitted to a further computing node using a different symmetric cryptographic key, such that the further computing node is unable to access the encrypted data package.

7. A distributed communication network according to claim 5, wherein the processing means is configured to re-encrypt the data package or the symmetric cryptographic key in response to a request by the user, or at a pre-determined time after the data package is transmitted to the further computing node, or once a further encrypted data package is received from the further computing node.

8. A distributed communication network according to claim 1, wherein the data package is encrypted using an Advanced Encryption Standard (AES) algorithm.

9. A distributed communication network according to claim 1, wherein the symmetric cryptographic key is encrypted using an elliptic-curve encryption (ECC) algorithm.

10. A method of controlling access to data shared on a distributed communications network, comprising:
  providing a first computing node comprising data, one or more cryptographic keys and computational logic defined by a set of rules of the distributed communications network, wherein the computational logic of each computing node is determined based on a pre-defined role allocated to a user of the computing node, the computational logic comprising at least defining (i) one or more roles associated with further computing nodes with which data sharing is permitted, and (ii) one or more types of data to be shared with each of the one or more roles;
  generating, at the first computing node, a data package to be shared in dependence on at least a portion of the data and the one or more types of data defined by the computational logic,
  encrypting, at the first computing node, the data package using a symmetric cryptographic key;
  encrypting, at the first computing node, the symmetric cryptographic key using a public cryptographic key of a public-private key pair; and
  transmitting, from the first computing node, the encrypted data package and the encrypted symmetric cryptographic key to a further computing node in dependence on the one or more roles defined by the computational logic.

11. A method according to claim 10, wherein the method further comprises receiving the public cryptographic key from the further computing node.

12. A method according to claim 10, wherein the further computing node comprises the private cryptographic key of the public-private key pair for decrypting the encrypted symmetric cryptographic key.

13. A method according to claim 10, wherein the method further comprises receiving, at the further computing node, the encrypted data package and encrypted symmetric cryptographic key.

14. A method according to claim 10, wherein the method further comprises:
  decrypting, at the further computing node, the encrypted symmetric cryptographic key using the private cryptographic key of the public-private key pair;
  decrypting, at the further computing node, the encrypted data package using the decrypted symmetric cryptographic key; and
  outputting, from the further computing node, the data contained within the data package for use.

15. A method according to claim 10, wherein the method further comprises re-encrypting, at the first computing node, the symmetric cryptographic key associated with a data package transmitted to the further computing node, such that the further computing node is unable to access the encrypted data package.

16. A method according to claim 10, wherein the method further comprises re-encrypting, at the first computing node, the data package transmitted to the further computing node using a different symmetric cryptographic key, such that the further computing node is unable to access the encrypted data package.

17. A method according to claim 15, wherein the re-encrypting is performed in response to a request by the user, or at a pre-determined time after the data package is transmitted to the further computing node, or once a further encrypted data package is received from the further computing node.

18. A method according to claim 10, wherein the data package is encrypted using an Advanced Encryption Standard (AES) algorithm.

19. A method according to claim 10, wherein the symmetric cryptographic key is encrypted using an elliptic-curve encryption (ECC) algorithm.

* * * * *